(12) United States Patent
Wu

(10) Patent No.: US 9,004,505 B1
(45) Date of Patent: Apr. 14, 2015

(54) FOLDING DEVICE FOR GOLF CART

(71) Applicant: Sports World Enterprise Co., Ltd., Tainan (TW)

(72) Inventor: Fang-Li Wu, Tainan (TW)

(73) Assignee: Sports World Enterprise Co., Ltd., Tainan (TW)

( * ) Notice: Subject to any disclaimer, the term of this patent is extended or adjusted under 35 U.S.C. 154(b) by 0 days.

(21) Appl. No.: 14/202,108

(22) Filed: Mar. 10, 2014

(51) Int. Cl.
*B62B 1/00* (2006.01)
*A63B 55/08* (2006.01)
*B62B 3/02* (2006.01)

(52) U.S. Cl.
CPC ................ *A63B 55/08* (2013.01); *B62B 3/022* (2013.01)

(58) Field of Classification Search
USPC ............... 280/DIG. 5, DIG. 6, 47.131, 47.17, 280/47.24, 47.34
See application file for complete search history.

(56) References Cited

U.S. PATENT DOCUMENTS 5,180,184 A * 1/1993 Chiu ............................. 280/646
5,857,684 A * 1/1999 Liao et al. ....................... 280/40

FOREIGN PATENT DOCUMENTS

TW         M463132        4/2013

* cited by examiner

*Primary Examiner* — John Walters
*Assistant Examiner* — James Triggs
(74) *Attorney, Agent, or Firm* — Rosenberg, Klein & Lee

(57) ABSTRACT

A folding device for a golf cart includes a main part to which two side wheels, a handle and a front wheel unit are connected. A tubular portion is movably mounted to a front wheel stem and a connection member is connected between the tubular member and a handle stem. Two rods are connected between side wheel stems. An operation member is pivotably connected to the tubular portion and has notches so that the protrusion of the main part is engaged with the notches to control the main part to connect to or to separate from the tubular member. The tubular member is movable on the front wheel stem so as to fold or expand the front wheel unit.

3 Claims, 7 Drawing Sheets

FOLDING DEVICE FOR GOLF CART

BACKGROUND OF THE INVENTION

1. Fields of the invention

The present invention relates to a folding device for a golf cart, and more particularly, to a folding device which is operated by operating a lever and holding a handle stem to easily fold the golf cart.

2. Descriptions of Related Art

The conventional golf cart is designed to carry the golf clubs which are heavy and have different sizes and lengths. The golf clubs are put in a golf bag and the golf cart has a reception area for positioning the golf bag. The players move the golf cart easily and conveniently. In order to save the space required, some of the conventional golf carts are foldable.

One of the conventional golf carts is disclosed in Taiwan Utility Model No. M463132 and comprises a top frame and a bottom frame, wherein the underside of the top frame is pivotably connected to the bottom frame. A handle is pivotably connected to the top frame and a locking portion is located on the top of the top frame. The handle has a movable block which is located corresponding to the locking portion. When the handle is pivoted upward, the movable block is connected to the locking portion. The top frame has a sliding member which has a link to be connected with rear wheels. The link is connected to the top frame by connection rods. The bottom frame has a contact rod at the rear end thereof so as to be connected with the handle on the top frame. The bottom frame further has connection tube connected with the sliding member. The bottom frame has a front wheel connected to the front end thereof.

However, when the golf cart is folded, the folded cart is not balance, such as one side is higher than the other side, or the rear end is higher than the front end. The space occupied of the folded cart is also not satisfied.

The present invention intends to provide a folding device for a golf cart so as to improve the shortcomings mentioned above.

SUMMARY OF THE INVENTION

The present invention relates to a folding device for a golf cart and comprises a main part having a holding member, and a handle stem is pivotably connected to the holding member. Two side wheel stems are connected to two sides of the main part. The main part has an engaging hole which is located corresponding to a front wheel stem. A protrusion is located at the underside of the engaging hole. A tubular portion is movably mounted to the front wheel stern. Two connection members each have the first end connected to the tubular portion, and the second end of each connection member is pivotably connected to the handle stem so as to connect the tubular portion and the handle stern. Two rods each have the first end connected to the tubular portion, and the second end of each rod is connected to the side wheel stem corresponding thereto so as to connect the tubular portion and the side wheel links. An operation member is pivotably connected to the underside of the tubular portion and has notches with which the protrusion of the main part is engaged. A lever is connected to one end of the operation member.

Preferably, the holding member has a recessed area defined in the inside thereof. The recessed area expands outward so that when the handle stem is expanded, the handle stem does not hit the holding member.

Preferably the main part has a restriction plate connected to the inside thereof so as to restrict the angle that the handle stem pivoted so as to protect the holding member from being damaged by the handle stem.

The primary object of the present invention is to provide a folding device which keeps the folded golf cart be balance and the folded golf cart occupies less space.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
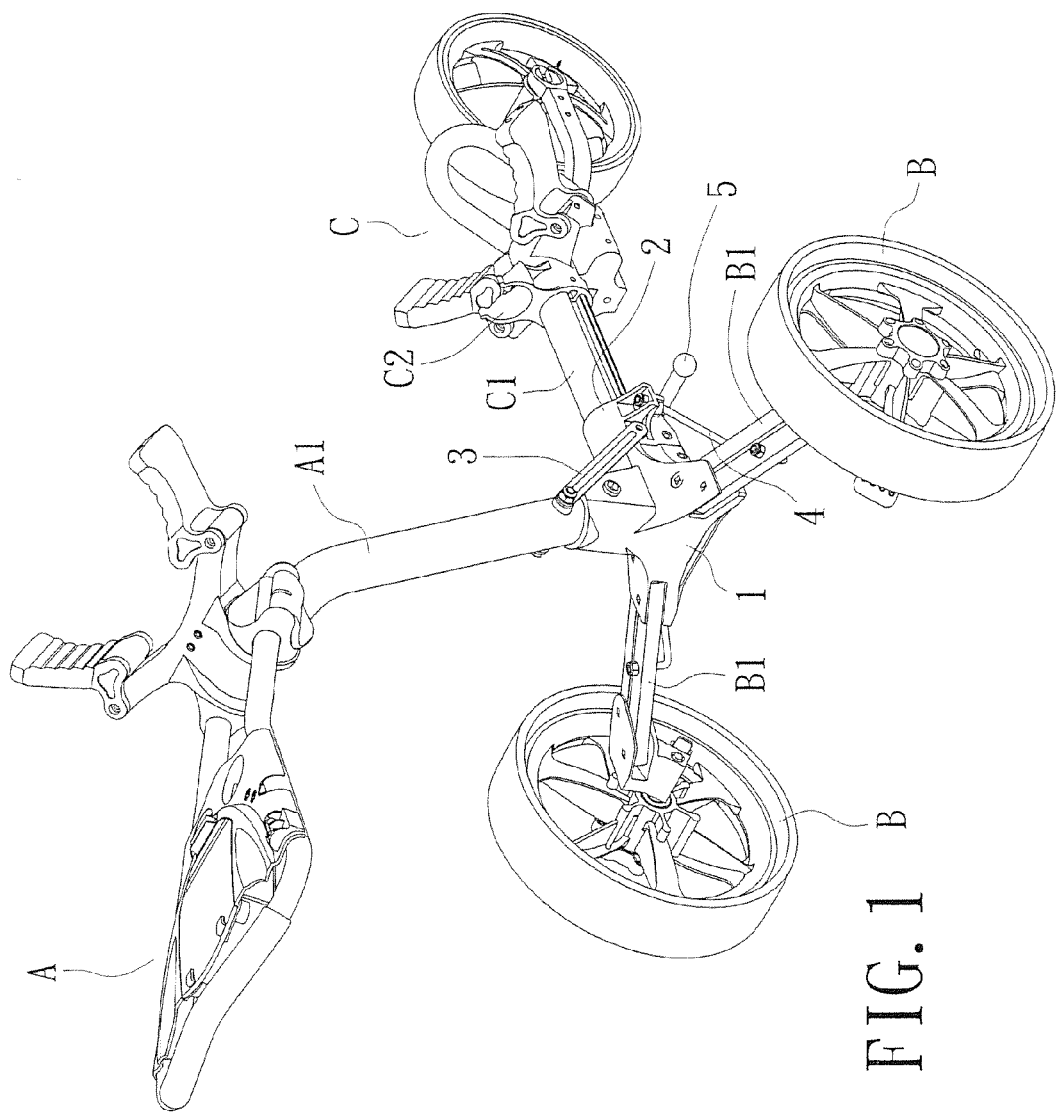
FIG. 1 is a perspective view to show the golf cart of the present invention.
Figure 2:
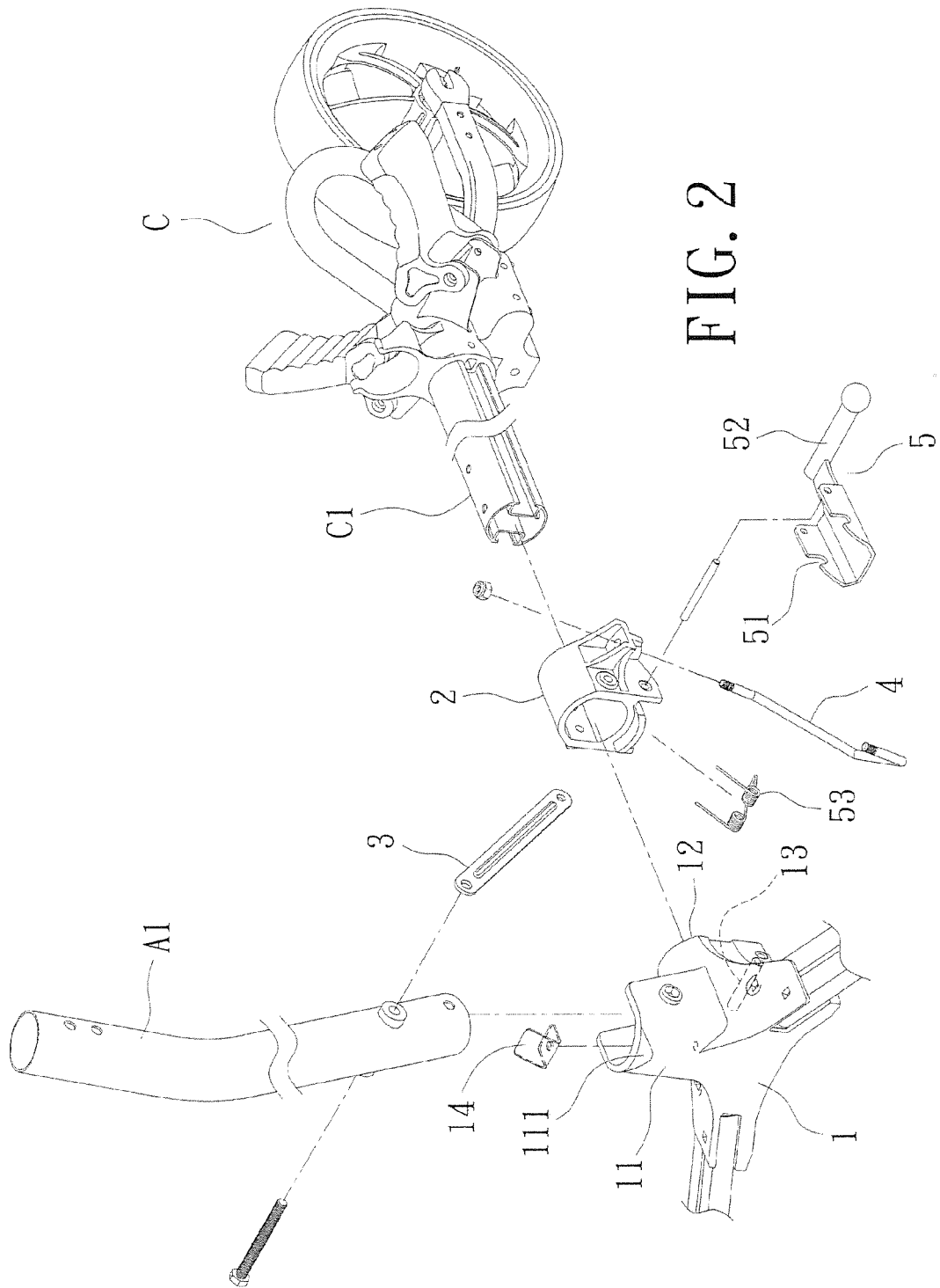
FIG. 2 is an exploded view to show the golf cart of the present invention.
Figure 3:
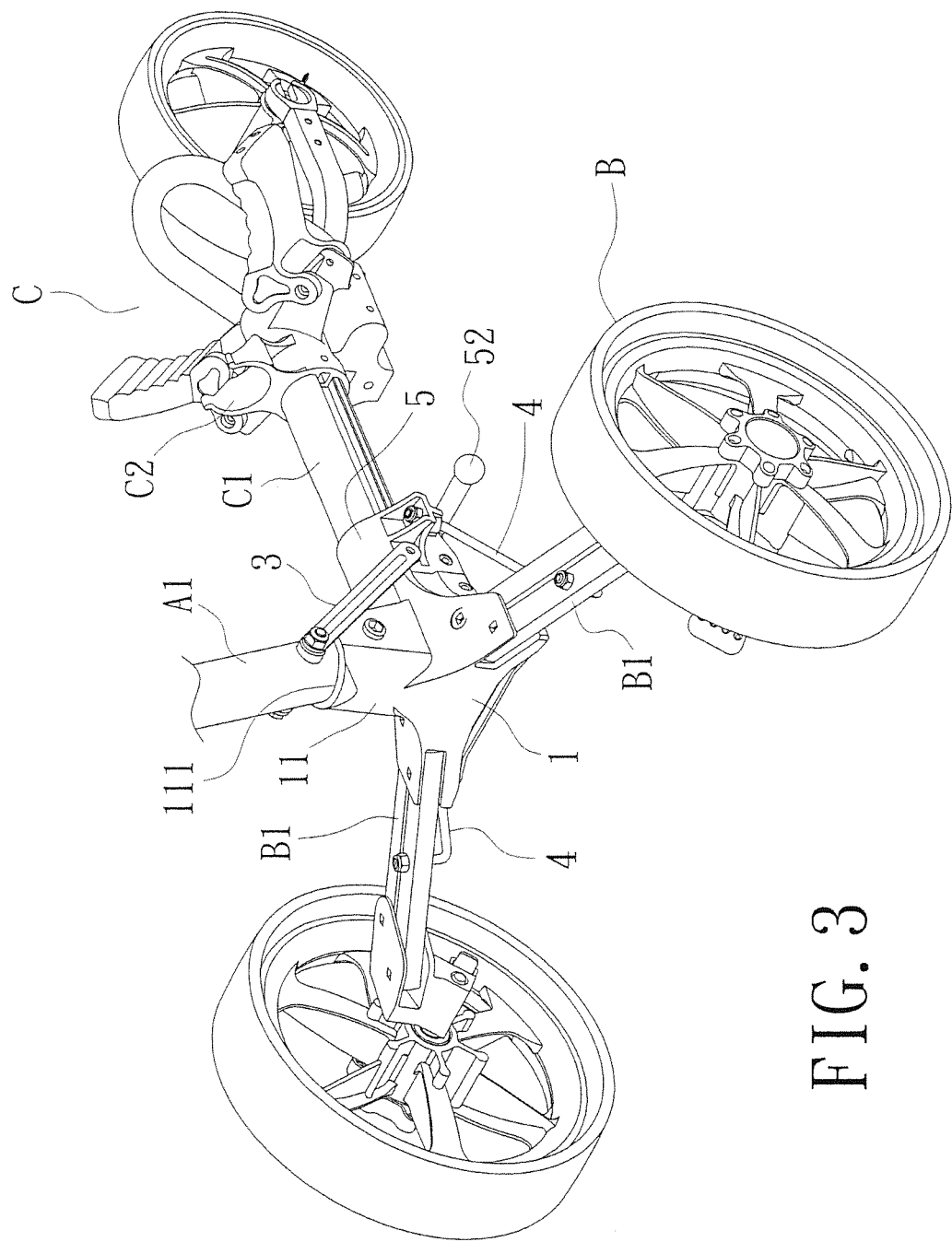
FIG. 3 is a perspective view to show a portion of the golf cart of the present invention.

Referring to FIGS. 1 to 3, the folding device for a golf cart of the present invention comprises a main part 1 having a holding member 11. A handle stem A1 is pivotably connected to the holding member 11. Two side wheel stems B1 are connected to two sides of the main part 1. The main part 1 has an engaging hole 12 which is located corresponding to a front wheel stem C1. A protrusion 13 is located at the underside of the engaging hole 12.

A tubular portion 2 is movably mounted to the front wheel stem C1. Two connection members 3 each have the first end connected to the tubular portion 2, and the second end of each connection member 3 is pivotably connected to the handle stem A1 so as to connect the tubular portion 2 and the handle stem A1.

Two rods 4 each have the first end connected to the tubular portion 2, and the second end of each rod 4 is connected to the side wheel stem B1 corresponding thereto so as to connect the tubular portion 2 and the side wheel stems B1.

An operation member 5 is pivotably connected to the underside of the tubular portion 2 and has notches 51 with which the protrusion 13 of the main part 1 is engaged. A lever 52 is connected to one end of the operation member 5.

As shown in FIGS. 1 to 4, when assembling the golf cart, two side wheels B are connected to the main part 1 by the two respective side wheel stems B1. A handle A is connected to the handle stern A 1 which is connected to the main part 1. The front wheel stem C1 is connected to the main part 1 and the tubular member 2. A front wheel unit C is connected to the front wheel stem C1. The connection members 3 are connected between the tubular member 2 and the handle stem A1. The rods 4 are connected between the side wheel stems B1. The operation member 5 is connected to the tubular member 2 and two resilient member 53 are connected to the operation member 5 so as to return the tubular member 2. The protrusion 13 is engaged with the notches 51 to maintain the expanded status.

Figure 4:
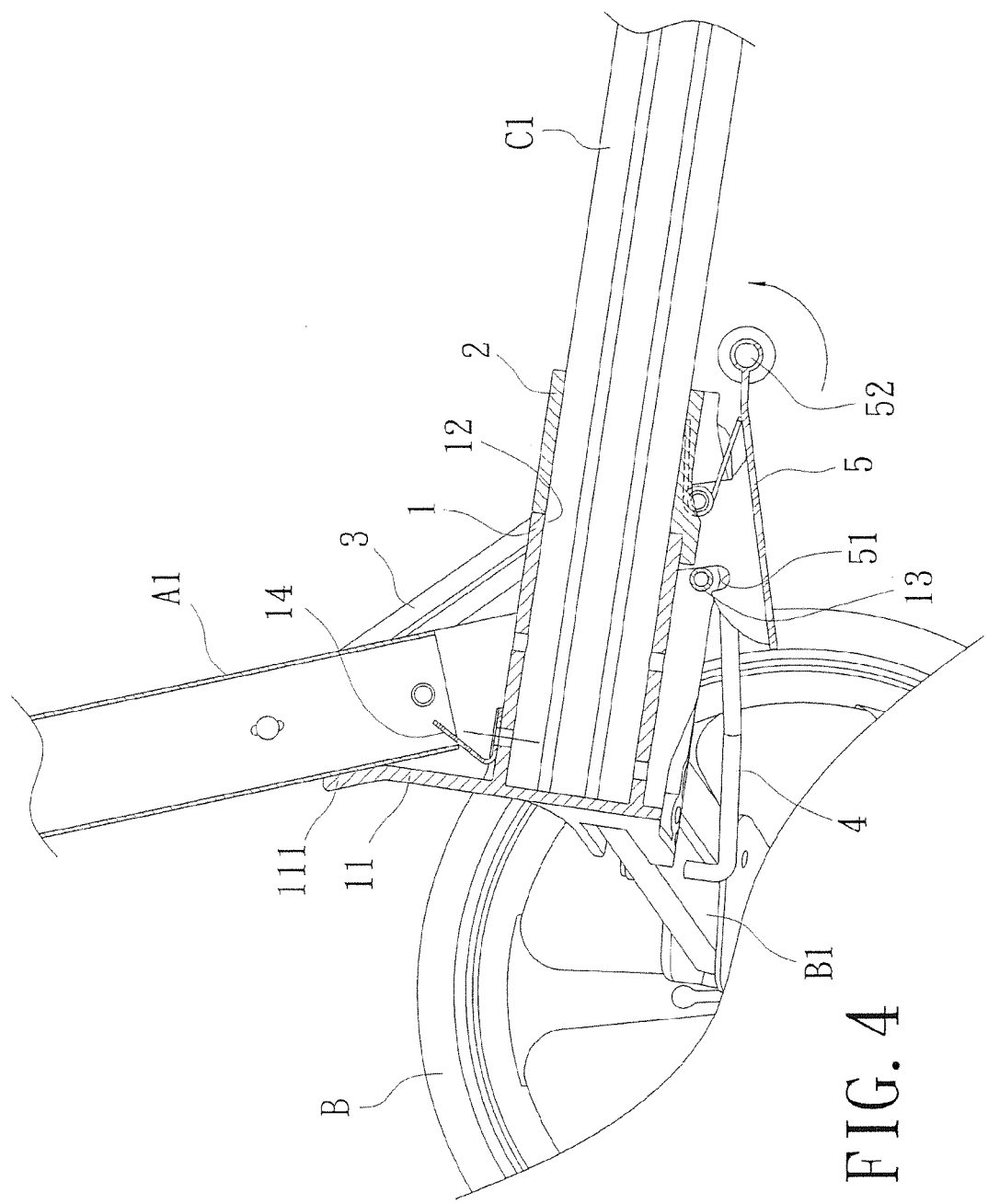
FIG. 4 is a cross sectional view to show the operation of the folding device of the of the present invention.
Figure 5:
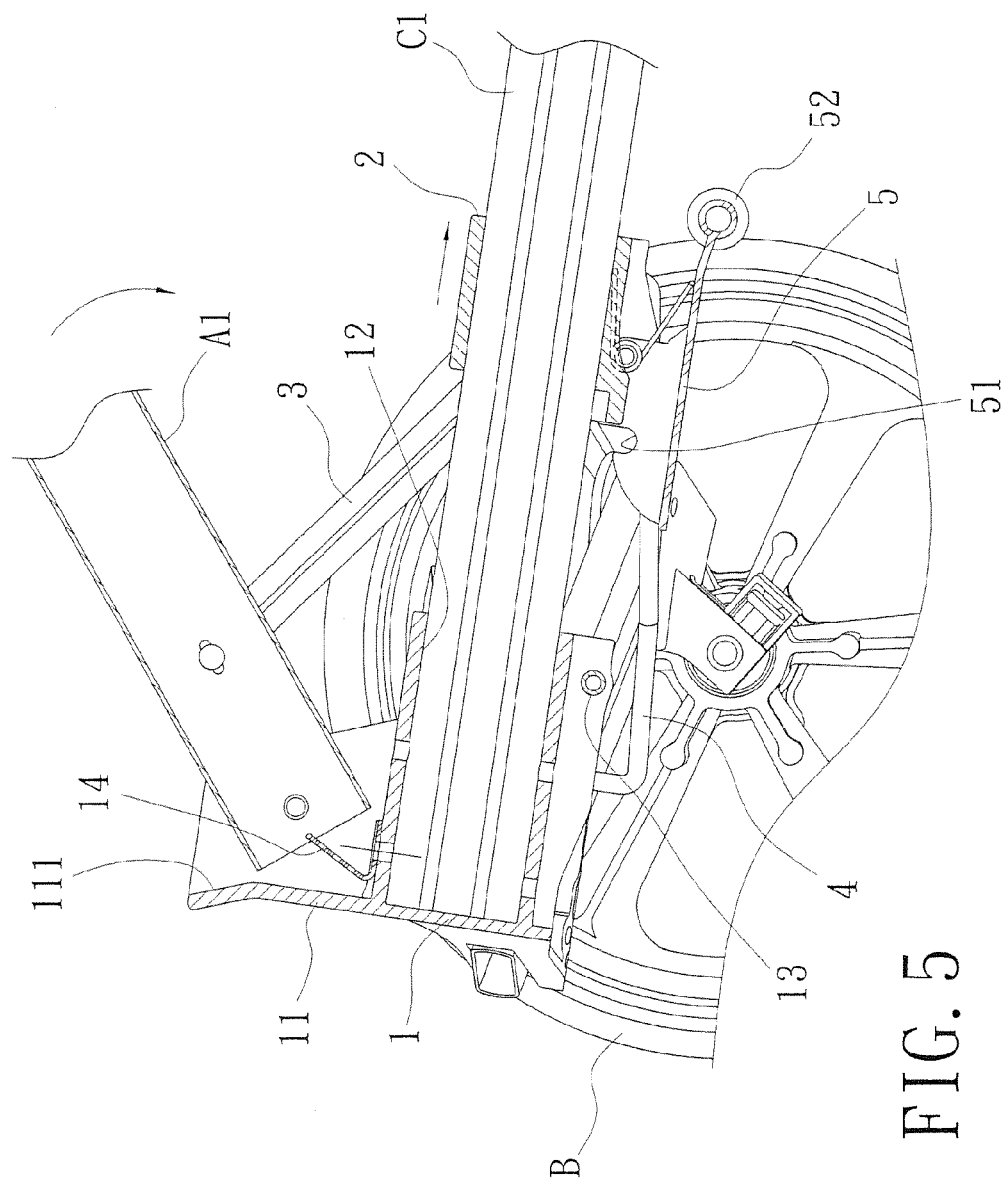
FIG. 5 is a cross sectional view to show the folded status of the folding device of the of the present invention.
Figure 6:
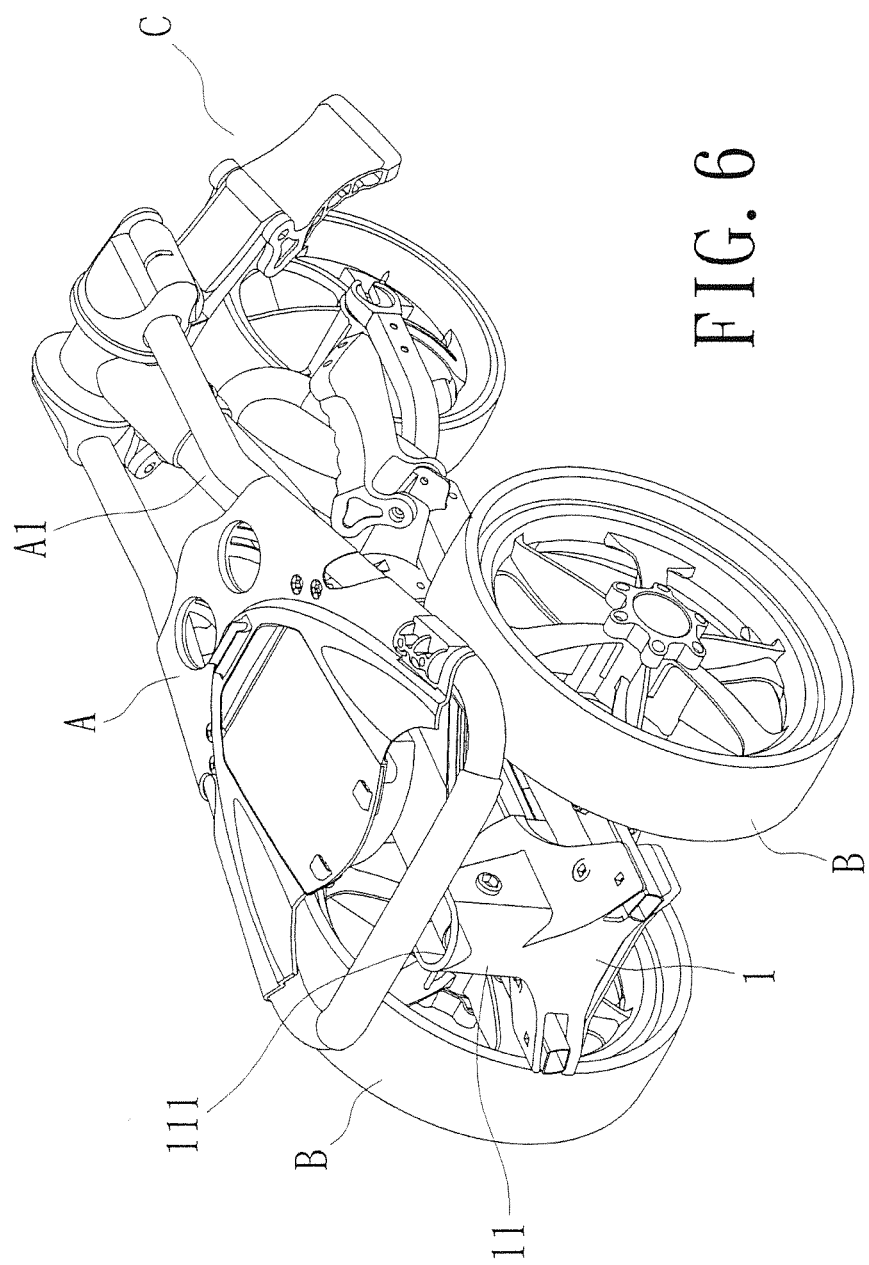
FIG. 6 is a perspective view to show folded golf cart of the present invention.

As shown in FIGS. 4 to 6, when folding the golf cart, the user pivots the lever 52 on the operation member 5 to separate the protrusion 13 from the notches 51 such that the handle stem A1 is able to be pivoted toward the front wheel link C1. During the pivoting action of the handle stem A1, the connection members 3 move the tubular member 2 along the front wheel stem C1. The movement of the tubular member 2 makes the rods 4 to fold the two side wheel stems B1. When the tubular member 2 moves to the other end of the front wheel stem C1, the front wheel unit C has a positioning member C2 which secures the handle stem A1. The handle A can also be pivoted toward the other direction to be further folded so that the golf cart is folded evenly and stably. The space occupied is less than the conventional golf cart.

Figure 7:
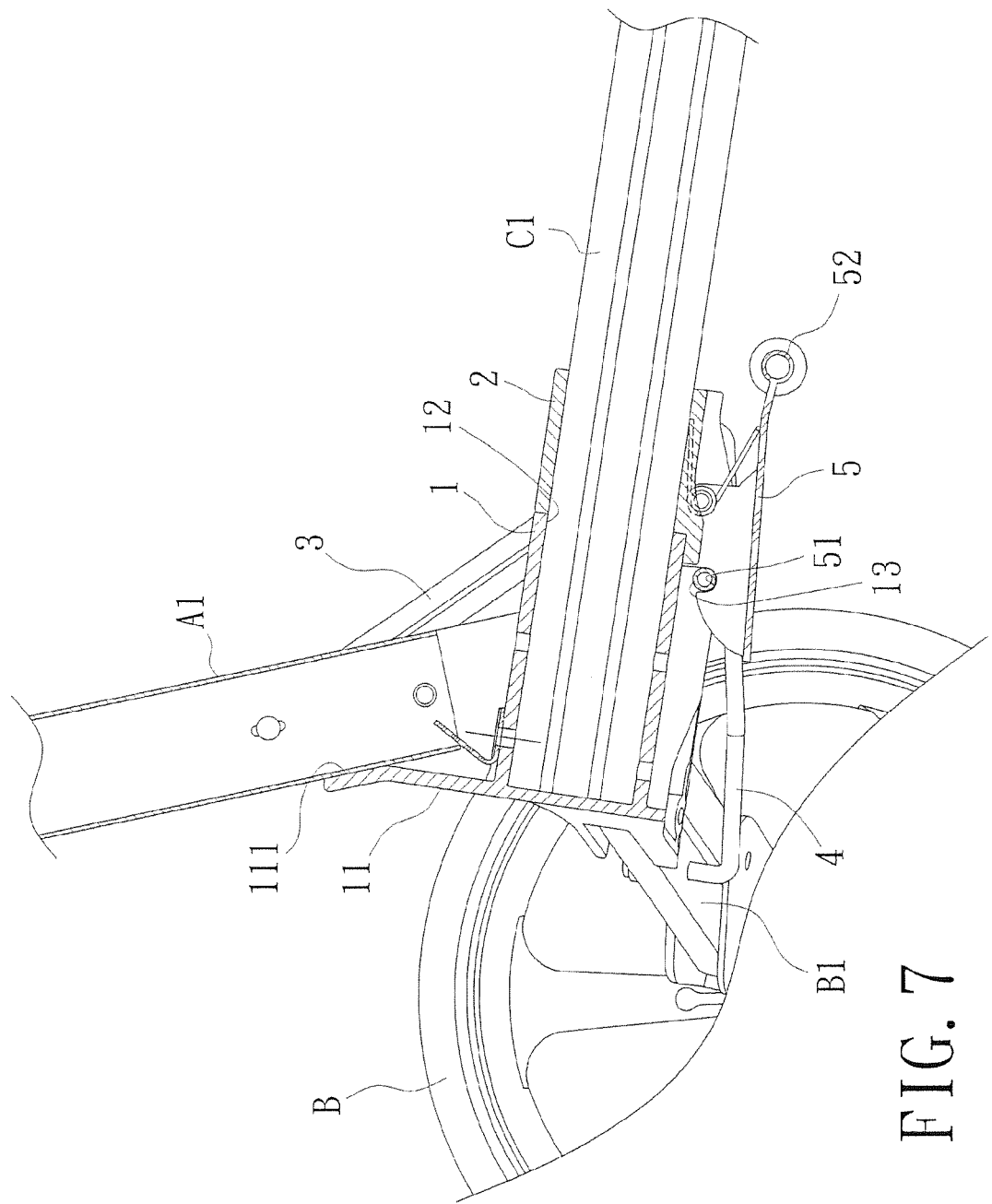
FIG. 7 is a cross sectional view to show that the folding device of the present invention is in expanded status.

As shown in FIG. 7, when expanding the golf cart, the handle stem A1 is separated from the positioning member C2 and pivoted upward. The handle stem A1 drives the connection members 3 to pull the tubular member 2 along the front wheel stem C1. IN the meanwhile, the tubular member 2 expands the side wheel stems B1 via the rods 4. When the handle stem A1 is pivoted to reach the holding member 11, a recessed area 111 of the holding member 11 allows the handle stem A1 to be pivoted to the desired angle to firmly support the whole frame of the golf cart while the main part 1 and the holding member 11 are not damaged.

The main part 1 has a restriction plate 14 connected to the inside thereof so as to restrict the angle that the handle stem A1 is pivoted, such that the handle stem A1 is not overly pivoted to damage the holding member 11.

The present invention has the following advantages which are that the folding action is easy by pivoting the lever 52 of the operation member 5 to separate the protrusion 13 from the notches 51. The folded golf cart is stable and neat, the space occupied by the folded golf cart is smaller than the conventional golf carts. The holding member 11 has the recessed area 111 which allows the handle stem A1 to be pivoted to the desired angle so that the main part 1 and the holding member 11 are not damaged. The main part 1 has the restriction plate 14 connected to the inside thereof to restrict the angle that the handle stem A1 is pivoted. The handle stem A1 is not overly pivoted to damage the holding member 11.

While we have shown and described the embodiment in accordance with the present invention, it should be clear to those skilled in the art that further embodiments may be made without departing from the scope of the present invention.

What is claimed is:

1. A folding device for a golf cart, comprising:
a main part having a holding member, a handle stem pivotably connected to the holding member, two side wheel stems connected to two sides of the main part, the main part having an engaging hole which is located corresponding to a front wheel stem, a protrusion located at an underside of the engaging hole;
a tubular portion movably mounted to the front wheel stem;
two connection members each having a first end connected to the tubular portion and a second end of each connection member pivotably connected to the handle stem so as to connect the tubular portion and the handle stem;
two rods each having a first end connected to the tubular portion and a second end of each rod connected to the side wheel stem corresponding thereto so as to connect the tubular portion and the side wheel stems, and
an operation member pivotably connected to an underside of the tubular portion and having notches with which the protrusion of the main part is engaged, a lever connected to an end of the operation member;
wherein the holding member has a recessed area defined in an inside thereof, the recessed area expands outward so that when the handle stem is expanded, the handle stem does not hit the holding member.

2. A folding device for a golf cart, comprising:
a main part having a holding member, a handle stem pivotably connected to the holding member, two side wheel stems connected to two sides of the main part, the main part having an engaging hole which is located corresponding to a front wheel stem, a protrusion located at an underside of the engaging hole;
a tubular portion movably mounted to the front wheel stem;
two connection members each having a first end connected to the tubular portion and a second end of each connection member pivotably connected to the handle stem so as to connect the tubular portion and the handle stem;
two rods each having a first end connected to the tubular portion and a second end of each rod connected to the side wheel stem corresponding thereto so as to connect the tubular portion and the side wheel stems, and
an operation member pivotably connected to an underside of the tubular portion and having notches with which the protrusion of the main part is engaged, a lever connected to an end of the operation member;
wherein the main part has a restriction plate connected to an inside thereof so as to restrict an angle that the handle stem is pivoted.

3. The device as claimed in claim 1, wherein the main part has a restriction plate connected to an inside thereof so as to restrict an angle that the handle stem is pivoted.

\* \* \* \* \*